United States Patent [19]

Leväaho et al.

[11] 4,427,212
[45] Jan. 24, 1984

[54] ARRANGEMENT FOR DETACHABLE COUPLING OF A TRAILER WITH PIVOTING WHEELS TO A BALL HITCH OF A VEHICLE

[75] Inventors: Veikko Leväaho; Esko K. Poltto, both of Helsinki, Finland

[73] Assignee: Esko Poltto Oy, Helsinki, Finland

[21] Appl. No.: 354,166

[22] Filed: Mar. 3, 1982

[30] Foreign Application Priority Data

Mar. 5, 1981 [FI] Finland ................................. 810696

[51] Int. Cl.³ .............................................. B60D 1/06
[52] U.S. Cl. .................................................. 280/511
[58] Field of Search ............... 280/511, 512, 513, 474, 280/446 B

[56] References Cited

U.S. PATENT DOCUMENTS 2,678,222  5/1954  Payzant .............................. 280/474
3,114,564 12/1963  Ulvestad ............................ 280/512
4,154,454  5/1979  Lewin .............................. 280/474 X Primary Examiner—John A. Pekar
Attorney, Agent, or Firm—Charles A. Blank

[57] ABSTRACT

The invention relates to an arrangement for detachable coupling of a trailer equipped with pivoting wheels to a ball hitch of a vehicle. At the forward end of the trailer there is a coupling receptacle to receive the ball hitch and a locking member to lock the ball hitch in the coupling receptacle. In order to prevent the trailer from rotating about a vertical axis through the ball hitch two opposing stops are fitted at the forward end of the trailer at such a distance from each other in the lateral direction that when the trailer is coupled to the ball hitch of the vehicle the stops bear against corresponding opposing stop faces at the rear end of the vehicle.

2 Claims, 5 Drawing Figures

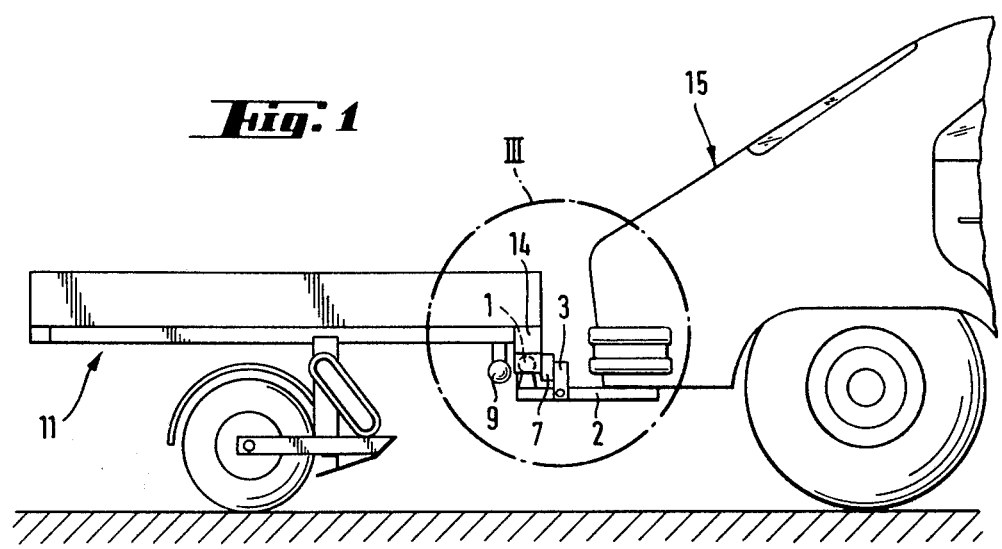
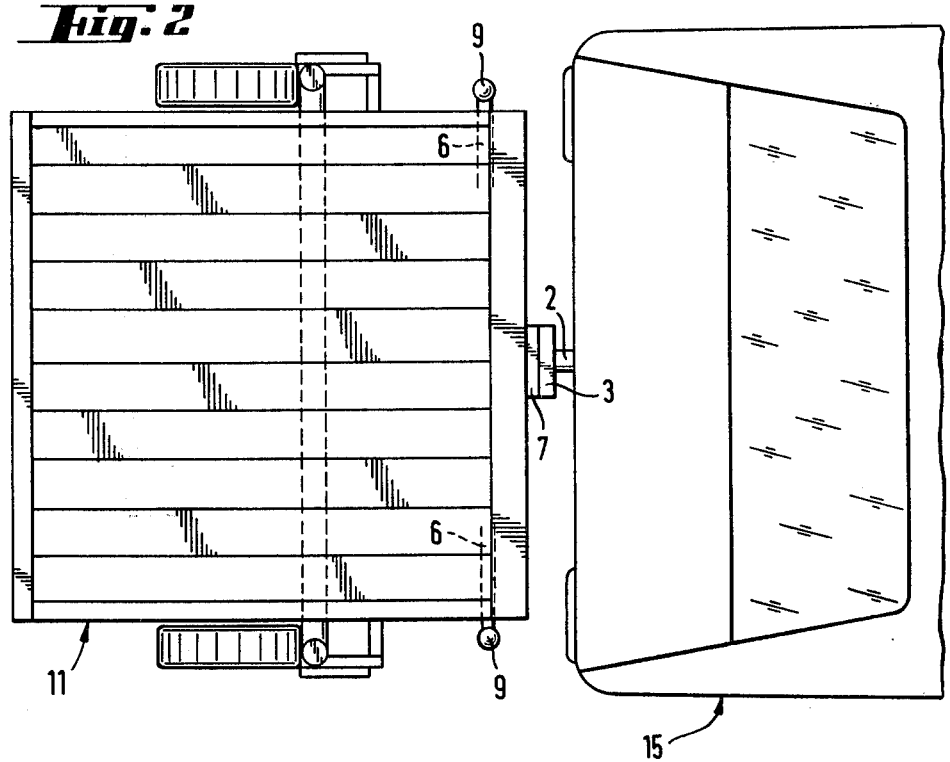

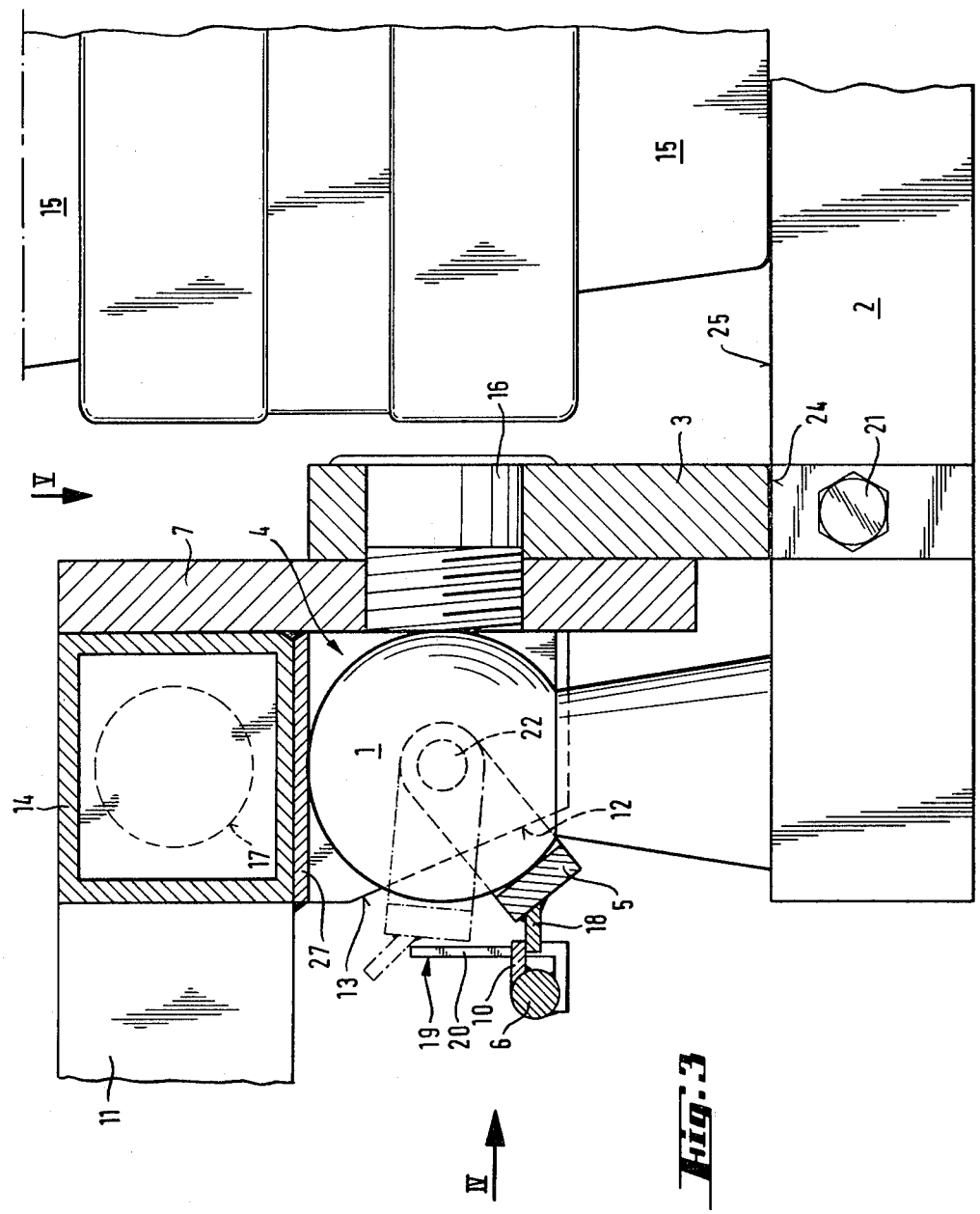

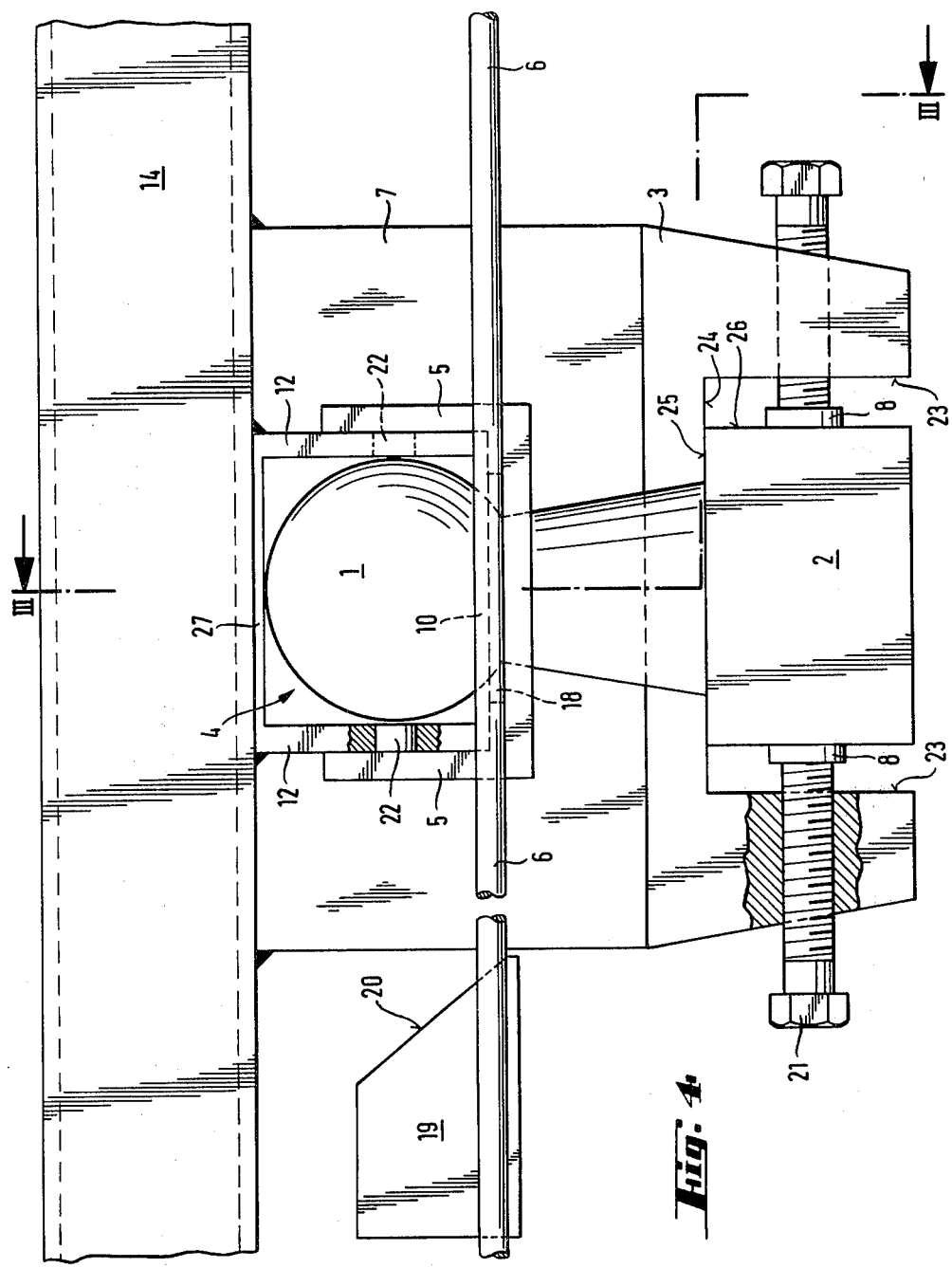

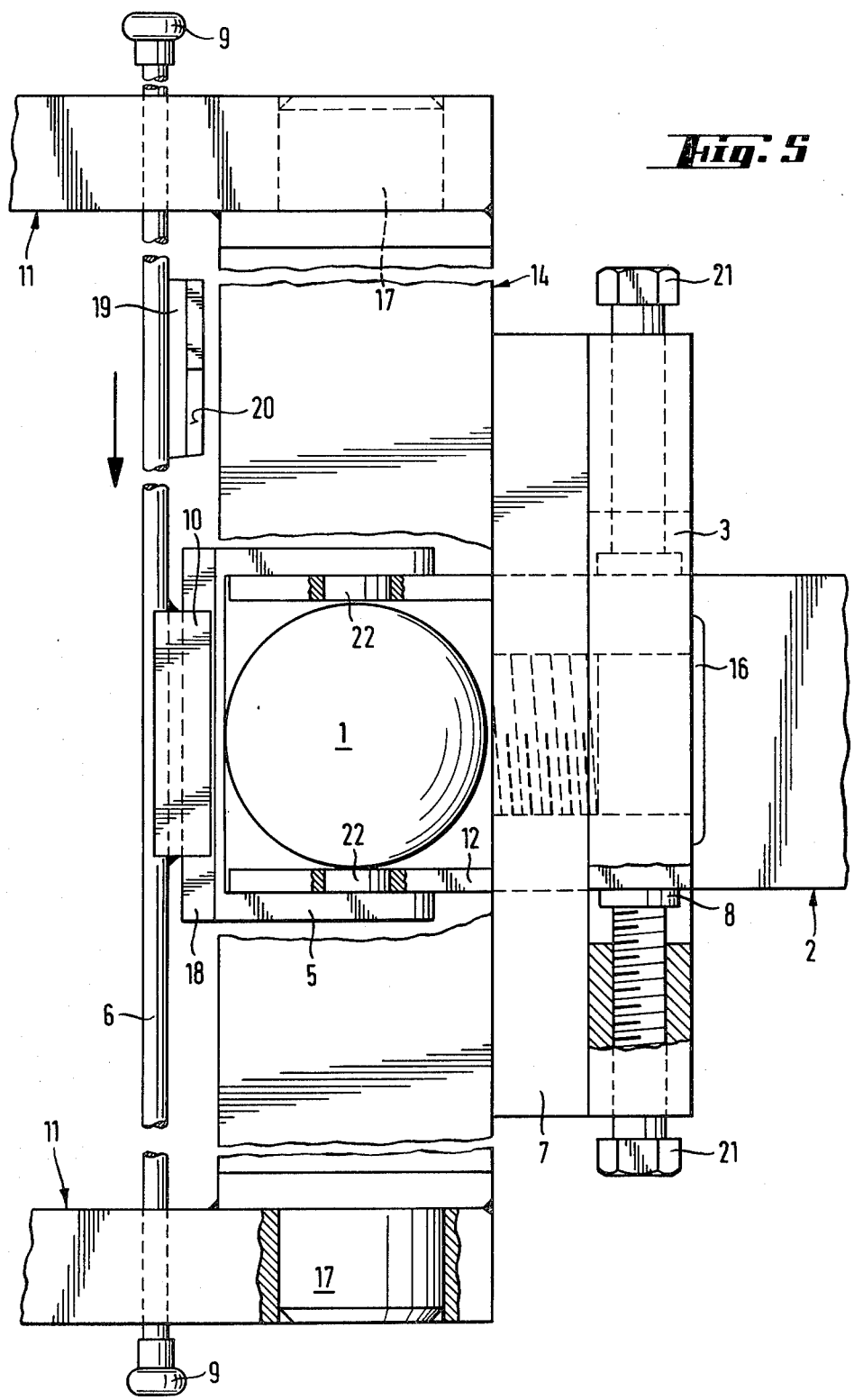

ARRANGEMENT FOR DETACHABLE COUPLING OF A TRAILER WITH PIVOTING WHEELS TO A BALL HITCH OF A VEHICLE

BACKGROUND OF THE INVENTION

This invention relates to an arrangement for detachable coupling of a trailer equipped with wheels which pivot in the direction of travel to a ball hitch at the rear end of a vehicle and in particular to an arrangement which comprises a coupling receptacle at the forward end of the trailer to receive said ball hitch, a locking member for securing the ball hitch in the coupling receptacle, and members to prevent the trailer pivoting about a vertical axis through the ball hitch.

Heretofore numerous different arrangements have been known for coupling a trailer to a ball hitch of a vehicle so that pivoting of the trailer about a vertical axis through the ball hitch is prevented. One usual solution has been to equip the vehicle with two or more ball hitches and the trailer correspondingly with an equal number of coupling receptacles, as, for example, is described in U.S. Pat. No. 4,076,264. This solution is not only expensive but is also inconvenient in use, since each coupling receptacle is equipped with a separate locking device which must be separately locked and opened. Moreover, this solution does not permit the trailer to pivot about a longitudinal axis in its direction of travel, which would be necessary on uneven roads especially.

This drawback has been eliminated by mounting the coupling receptacles on a common rotating axle in the direction of travel. Such a solution, however, is still more expensive and the locking device of each coupling receptacle must still be separately locked and opened.

An arrangement is known from U.S. Pat. No. 2,475,174 for coupling a trailer equipped with pivoting wheels to a vehicle equipped with a single ball hitch. In this arrangement pivoting of the trailer is prevented by a cable, both ends of which are secured to the bumper of the vehicle on opposite sides, the cable being trained about pulleys on the trailer and locked in place by a separate locking device which prevents movement of the cable and thereby also prevents pivoting of the trailer about a vertical axis passing through the ball hitch. Such an arrangement permits the trailer to pivot about lateral and longitudinal axes through the ball hitch, but detachment of the trailer is extremely inconvenient, complicated, and requires the use of tools.

An object of the present invention is accordingly to provide an arrangement for the detachable coupling of a trailer equipped with pivoting wheels to a ball hitch of a vehicle which prevents pivoting of the trailer about a vertical axis through the ball hitch but which permits pivoting of the trailer about lateral and longitudinal axes through the ball hitch and which arrangement is cheap, reliable in operation and simple to use.

SUMMARY OF THE INVENTION

The present invention provides an arrangement for detachable coupling of a trailer equipped with pivoting wheels to a ball hitch of a vehicle, in which at least two opposing stops are fitted at the front end of the trailer at such a distance from each other in the lateral direction that when the trailer is coupled to the ball hitch of the vehicle the stops bear or can be brought to bear against corresponding opposing stop faces at the rear of the vehicle.

In the preferred embodiment of the invention rotation of the trailer about a vertical axis through the ball hitch is prevented by two oppositely disposed stop faces extending in an essentially longitudinal direction, which stop faces are so fitted that when the trailer is coupled to the ball hitch of the vehicle said stop faces bear against corresponding oppositely disposed stop faces extending in an essentially longitudinal direction at the rear of the vehicle.

The meaning of the words "extending in an essentially longitudinal direction" is very wide in this context, and includes also curved faces. Thus the stop faces mentioned can, for example, be formed by the lateral surfaces of a peg of circular cross-section extending downwards from the forward part of the trailer, said peg being so contrived that, when the trailer is coupled to the vehicle, it is a close fit in a corresponding hole of circular cross-section in the draw bar of the ball hitch. Alternatively the peg can be of rectangular form in cross-section, in which case there is a hole of corresponding rectangular form in the draw bar, the width of which hole is the same or only slightly greater than the width of the peg so that the peg is not able to move appreciably in a lateral direction within the hole. Advantageously, however, the afore-mentioned oppositely disposed stop faces extending in an essentially longitudinal direction are formed by the opposing side faces of a slot in the lower end of a member extending in a downwards direction from the forward part of the trailer, said side faces being essentially vertical and at a distance from each other which essentially corresponds to the width of the draw bar, which is of rectangular form in cross-section. The afore-mentioned member with a slot in its lower end is advantageously at some distance from the coupling receptacle which receives the ball hitch in order to reduce the strain to which the above-mentioned stop faces are subject. In this way, namely, a double-arm lever arrangement is formed in which the force acting at the centre of mass of the trailer multiplied by the distance of said centre of mass from the centre of the ball hitch is equal to the force acting on said stop faces multiplied by the distance of the slot from the centre of the ball hitch. The greater the distance of the slot from the centre of the ball hitch the less the strain to which said stop faces are subject.

The width of the slot is advantageously dimensioned to correspond to the widest draw bar, in which case the opposing faces of the slot are fitted with screws which are adjustable in a lateral direction and by means of which the effective width of the slot can be adjusted, the ends of said screws forming the afore-mentioned stop faces. In this way the downwards orientated member which has a longitudinal slot in its lower end can be connected to the draw bar so that the trailer is not able to pivot about a vertical axis through the ball hitch. In order that the trailer is nevertheless able to pivot about a longitudinal axis the afore-mentioned downwards orientated member connecting the trailer to the draw bar can consist of two parts which are joined to each other pivotally, the pivot axis being coincident with the longitudinal line through the centre of the ball hitch. This permits the trailer to turn about the longitudinal axis but at the same time nevertheless prevents the trailer turning about the vertical axis through the ball hitch.

The downwards orientated coupling receptacle located at the forward end of the trailer and intended to receive the ball hitch is open at the rear at least in its lower part and can be closed by a swivelling arched member which is pivotally joined to the coupling receptacle by means of a lateral axle and which in one extreme position at least partially closes the open part at the rear of the coupling receptacle thereby preventing detachment of the ball hitch.

Movement of said swivelling arched member is advantageously achieved by means of a lateral rod fitted to the forward part of the trailer so that it can be pushed back and forth along its own length and having a first projection, so arranged that with said rod in one extreme position and said swivelling arched member in its locking position said first projection is on top of said swivelling arched member or a fixed extension thereof, and a second projection of essentially L-form in cross-section and at such a distance from the first projection that when the rod is in its other extreme position, in which position the first projection has been moved clear of the swivelling arched member or the fixed extension thereof, said second projection is pushed under the swivelling arched member or the fixed projection thereof thereby lifting said arched member. The essentially vertical part of the second projection, which is of L-form in cross-section, is bevelled on the edge which faces towards the arched member and is of such a height as to lift the arched member sufficiently for the ball hitch to be withdrawn from the coupling receptacle.

DESCRIPTION OF THE DRAWINGS

FIG. 1 illustrates a trailer equipped with a coupling arrangement according to the invention coupled to a vehicle, FIG. 2 illustrates the same trailer coupled to a vehicle viewed from above, FIG. 3 illustrates a cross-sectional side view of the preferred embodiment of the invention, FIG. 4 illustrates a frontal view of the embodiment shown in FIG. 3, and FIG. 5 illustrates the embodiment shown in FIG. 3 viewed from above.

DESCRIPTION OF THE PREFERRED EMBODIMENTS

In FIGS. 1 and 2 the vehicle is denoted by the reference number 15 and the trailer, which is equipped with wheels which are free to turn in the direction of travel and which is coupled to the rear of the vehicle, by the reference number 11. As is seen more clearly from FIGS. 1 and 2 there is a rearwards orientated draw bar 2 fixed to the rear of the frame of the vehicle 15 on its longitudinal axis. From FIG. 3 it will be seen that there is a ball hitch 1 fixed to the end of the draw bar 2 and orientated essentially vertically upwards.

As is seen more clearly from FIGS. 3-5, on the forward part of the trailer 11 mounted on its central axis there is a downwards orientated coupling receptacle 4 to receive the ball hitch 1; and as is seen more clearly from FIGS. 3 and 4, the coupling receptacle 4 is formed by a top wall 27 fixed to the frame of the trailer 11, side walls 12 and, forming the front wall, the member 7 which is orientated downwards from the frame of the trailer 11. The rear wall 13 of the coupling receptacle 4 is, however, left open, but is partially enclosed by a swivelling arched member 5 pivotally attached to the side walls 12 of the coupling receptacle 4 by a substantially horizontal axle 22, said axle 22 being coaxial with an imagined essentially horizontal lateral line through the centre of the ball hitch 1 and the inner face of said arched member 5 being at a distance from the centre of the ball hitch 1 substantially the same as or only slightly greater than the radius of the ball hitch 1 so that said arched member 5 moves in contact with or in the immediate vicinity of the surface of the ball hitch 1. With the arched member 5 in the lower position shown in FIG. 3 detachment of the ball hitch from the coupling receptacle 4 is prevented, but when the arched member 5 is turned to the upper position shown in FIG. 3 by a broken line the coupling receptacle 4 can be detached from the ball hitch 1 by raising the forward end of the trailer 11.

In order to lock the arched member 5 in the lower position shown in FIG. 3 and to raise it to the upper position shown in FIG. 3 by a broken line, a lateral bar 6 which can be moved back and forth in the direction of its own length is fitted under the frame of the trailer 11, which lateral bar 6 has knobs 9 at either end for moving it back and forth and fixedly attached to its central section at a distance along the bar from each other a first projection 10 and a second projection 19, said second projection 19 being of essentially L-form in cross-section. The projection 10 is so fitted that it locks the arched member 5 in the lower position when the bar 6 is in one extreme position and the projection 19 is so fitted that it holds the arched member 5 in the upper position, as shown by a broken line in FIG. 3, when the bar 6 is in the opposite extreme position. For this purpose an extension 18 is fixed to the outer face of the arched member 5, the projection 10 being so arranged that it is pushed on top of said extension 18 when the bar 6 is pushed in the direction opposite to that of the arrow shown in FIG. 5 so as to lock the arched member 5 in its lower position.

The second projection 19, which is essentially of L-form in cross-section, is at such a distance from the first projection 10 that when the bar 6 is pushed by a knob 9 in the direction of the arrow in FIG. 5 the first projection 10 is moved completely clear of the extension 18 of the arched member 5 before the second projection 19 comes into contact with the extension 18 of the arched member 5. As is seen more clearly from FIG. 4, the vertical part of the L-shaped projection 19 is bevelled upwards and backwards on the edge 20 which is to the fore in the direction of the arrow shown in FIG. 5 and the lower end of said bevelled edge 20 extends slightly below the lower face of the extension 18 of the arched member 5, so that with the arched member 5 in the lower position the bevelled edge 20 pushes under the extension 18 when the bar 6 is pushed in the direction shown by the arrow in FIG. 5. The vertical part of the L-shaped projection 19 is so high that, when it has been pushed to the full extent under the extension 18 of the arched member 5, the arched member 5 is raised to the upper position, as shown by a broken line in FIG. 3, whereupon the ball hitch 1 can be freely withdrawn from the coupling receptacle 4.

As has already been mentioned above, the forward end of the trailer has attached to it a downwards orientated member 7 which forms the front wall of the coupling receptacle 4 and which is extended by a member 3, the members 3 and 7 being joined together by a pivot 16 whose axis intersects the centre point of the ball hitch 1, so that the trailer 11 can rotate about its longitudinal axis which passes through the centre point of the ball hitch 1 and the pivot point of members 3 and 7. At the lower end of the extension member 3 there is a longitudinal slot or cut having vertical side faces 23 and a top face 24, said top face 24 being arranged to rest against the upper surface 25 of the draw bar 2. Threaded bolts 21 are fitted through the downwards orientated forks of the extension member 3, the opposing inner ends of the bolts 21 being fitted with stops 8 so that by turning the bolts 21 the distance of the stops 8 from each other and thus the effective width of the longitudinal slot or cut in the extension member can be adjusted so that the draw bar 2 is a close fit between the stops 8. If desired the bolts 21 can be turned towards each other still further so that the stops 8 press tightly against the side surfaces 26 of the draw bar 2. This is not essential, however, as the arched member 5 holds the ball hitch 1 locked in the coupling receptacle 4 when the bar 6 is in the lock position.

By means of the bolts 21 the effective width of the slot or cut in the extension member 3 can be adjusted so that use of the coupling device according to the invention is not restricted to any fixed width of draw bar 2. If a coupling device according to the invention is always to be used with draw bars of the same then the bolts 21 are not needed; the width of the slot or cut in the extension member 3 can be dimensioned according to the width of the draw bar 2 so that the draw bar 2 is a close fit in the slot or cut. Alternatively the extension member 3 may have one or more projections on its lower end which are a close fit in a corresponding hole or holes in the draw bar 2 thereby preventing movement of the extension member 3 in a lateral direction.

The slot or cut in the extension member 3 can alternatively be so deep that when the trailer 11 is coupled to the vehicle 15 a gap is left between the top face 24 of the slot and the upper surface 25 of the draw bar 2. In this case the trailer 11 can turn about a lateral axis through the centre of the ball hitch 1. Alternatively the trailer 11 can be attached pivotally to the coupling receptacle 4 so as to turn about a lateral axle, as illustrated in FIG. 3 by the reference number 17. In this case it is not necessary to leave any gap between the top face 24 of the slot and the upper surface 25 of the draw bar 2.

What is claimed is:

1. Arrangement for detachable coupling of a trailer equipped with pivoting wheels to a ball hitch of a vehicle, said arrangement comprising: a coupling receptacle at the forward end of the trailer to receive the ball hitch; a locking member to lock the ball hitch in the coupling receptacle; and means to prevent the trailer from rotating about a vertical axis through the ball hitch, said means for preventing rotation of the trailer about a vertical axis through the ball hitch comprising at least two opposing stops fitted at the forward end of the trailer at such a distance from each other in the lateral direction that when the trailer is coupled to the ball hitch of the vehicle the stops bear or can be brought to bear against corresponding opposing stop faces at the rear of the vehicle, the stops being two opposingly disposed screw-threaded bolts fitted to the opposing sides of a longitudinal slot in the lower end of a downwards orientated member fixedly attached to the forward end of the trailer, said longitudinal slot being adapted to receive the draw bar to which the ball hitch is attached; which bolts are so fitted that they can be screwed towards each other and the distance between them thereby adjusted so that the draw bar is a close fit between them; the downwards oriented member fixedly attached to the forward part of the trailer comprising two parts which are joined to each other pivotally, the pivot axis being coincident with the longitudinal line through the centre of the ball hitch, thereby permitting rotation of the trailer about its longitudinal axis.

2. Arrangement for detachable coupling of a trailer equipped with pivoting wheels to a ball hitch of a vehicle, said arrangement comprising: a coupling receptacle at the forward end of the trailer to receive the ball hitch; a locking member to lock the ball hitch in the coupling receptacle; and means to prevent the trailer from rotating about a vertical axis through the ball hitch, said means for preventing rotation of the trailer about a vertical axis through the ball hitch comprising at least two opposing stops fitted at the forward end of the trailer at such a distance from each other in the lateral direction that when the trailer is coupled to the ball hitch of the vehicle the stops bear or can be brought to bear against corresponding opposing stop faces at the rear of the vehicle; a rear wall of the coupling receptacle being open at least in its lower part and the locking member being a swivelling arched member partially encircling the coupling receptacle and pivotally attached to the coupling receptacle by means of a lateral axle so that in one of its extreme positions said arched member at least partially encloses the open part of the rear wall of the coupling receptacle thereby preventing detachment of the ball hitch; the arrangement further comprising a lateral bar adapted to be pushed back and forth along its own length and which has a first projection, so arranged that with the bar in one extreme position and with the arched member in its lock position said first projection extends on top of the arched member or a fixed extension thereof, and a second projection of essentially L-form in cross-section, said second projection being at such a distance from the first projection that with the bar in its other extreme position, in which position the first projection has been moved from on top of the arched member or its fixed extension, said second projection is pushed under the arched member or its fixed extension in order to raise the arched member; the essentially vertical part of the L-shaped second projection being bevelled on that edge which is towards the arched member and of such a height that the arched member is turned upwards sufficiently for the ball hitch to be detached from the coupling receptacle.

* * * * *